US010682964B1

(12) United States Patent
Turner et al.

(10) Patent No.: US 10,682,964 B1
(45) Date of Patent: Jun. 16, 2020

(54) LOAD LIFTING SYSTEM (76) Inventors: Christopher L Turner, Parker, SD (US); Michael L Turner, Parker, SD (US)

( * ) Notice: Subject to any disclaimer, the term of this patent is extended or adjusted under 35 U.S.C. 154(b) by 866 days.

(21) Appl. No.: 12/512,198

(22) Filed: Jul. 30, 2009

Related U.S. Application Data (63) Continuation-in-part of application No. 12/123,915, filed on May 20, 2008, now abandoned.
(60) Provisional application No. 60/939,395, filed on May 22, 2007.

(51) Int. Cl.
*B60P 1/44* (2006.01)
*B60R 9/06* (2006.01)
*A01M 31/00* (2006.01)

(52) U.S. Cl.
CPC ............ *B60R 9/06* (2013.01); *A01M 31/006* (2013.01); *B60P 1/4407* (2013.01)

(58) Field of Classification Search
CPC ... Y10S 224/924; Y10S 224/921; B60R 9/06; B60R 9/00; B60R 11/00; B60P 1/4407; B60P 1/4421; B60P 1/5433
USPC .......... 414/462–463; 224/488, 502, 512–516
See application file for complete search history.

(56) References Cited

U.S. PATENT DOCUMENTS

| | | | | |
|---|---|---|---|---|
| 2,379,797 A | * | 7/1945 | Gilbert | A01B 43/00 414/680 |
| 2,567,104 A | * | 9/1951 | Di Fonzo | B60R 9/045 414/462 |
| 3,822,801 A | * | 7/1974 | Morgan, Jr. | B60R 9/06 414/462 |
| 3,894,668 A | * | 7/1975 | Chapman | B62D 43/02 224/522 |
| 3,904,051 A | * | 9/1975 | Tsuchiya | E02F 3/384 414/694 |
| 4,191,316 A | * | 3/1980 | Baumgartner | B60R 9/10 414/462 |
| 4,406,384 A | * | 9/1983 | Schantz | B60R 9/06 224/329 |
| 4,815,638 A | * | 3/1989 | Hutyra | B60R 9/10 224/516 |
| 5,522,530 A | * | 6/1996 | Boettcher | B60R 9/06 224/282 |
| 5,662,451 A | | 9/1997 | Muzzi | |

(Continued)

OTHER PUBLICATIONS http://www.youtube.com/watch?feature=player_detailpage&v=YPDTkzISgEY; Sep. 17, 2007; "Load a 240 lb Hog with ease with Hook-A-Rack!", by hookarack.*

(Continued)

*Primary Examiner* — Gregory W Adams (57) ABSTRACT

A Load Lifting System for providing a easy lift accessory which may be utilized by one person. The Load Lifting System includes a vehicle mounting assembly to selectively secure the load lifting system to the vehicle and which may include a plurality of hook members for engaging a rack mounted to the vehicle and a bumper mounting assembly for abutting a surface of a bumper of the vehicle and a load lifting assembly pivotally coupled to the vehicle mounting assembly and operationally coupleable to a winch mounted on the vehicle, additionally the load lifting assembly may include a plurality of pivotally mounted load carrying hooks for facilitating the transport of liquid and dry goods while minimizing spillage.

15 Claims, 4 Drawing Sheets

(56) References Cited

U.S. PATENT DOCUMENTS

| | | | | |
|---|---|---|---|---|
| 5,735,561 A * | 4/1998 | Parkins | ............... | B63C 3/06 114/44 |
| 5,911,556 A | 6/1999 | Caldwell | | |
| 5,964,565 A | 10/1999 | Skotzky | | |
| 5,975,831 A | 11/1999 | Martin | | |
| 6,131,859 A * | 10/2000 | Giuliano | ............... | F16L 3/1016 24/279 |
| 6,607,345 B2 * | 8/2003 | McElhany | ............ | B60P 1/4407 414/462 |
| 6,609,481 B1 | 8/2003 | McCarty | | |
| 6,626,748 B2 | 9/2003 | Homer | | |
| 6,638,001 B1 | 10/2003 | McKinley | | |
| 6,769,858 B1 * | 8/2004 | Butler | ............... | B60P 1/4421 414/462 |
| 6,869,265 B2 | 3/2005 | Smith | | |
| 7,293,951 B2 * | 11/2007 | Meeks | ............... | 414/462 |
| 7,296,959 B2 * | 11/2007 | Davis | ............... | B60R 9/06 224/401 |
| 7,896,604 B1 * | 3/2011 | Donlin et al. | ............... | 414/462 |
| 2002/0168257 A1 * | 11/2002 | Smith et al. | ............... | 414/462 |
| 2005/0000120 A1 * | 1/2005 | Potak | ............... | B60R 9/06 37/231 |
| 2005/0254925 A1 * | 11/2005 | Braquet | ............... | 414/462 |
| 2006/0045686 A1 * | 3/2006 | Alexander | ............ | A61G 3/0209 414/462 |
| 2006/0104767 A1 * | 5/2006 | Dugger | ............... | B60R 9/06 414/462 |
| 2006/0120841 A1 * | 6/2006 | Meeks | ............... | 414/462 |
| 2006/0182571 A1 * | 8/2006 | Hightower | ............ | A01K 15/00 414/466 |
| 2008/0292435 A1 * | 11/2008 | Turner et al. | ............... | 414/462 |
| 2010/0111658 A1 * | 5/2010 | Galliano et al. | ............ | 414/462 |

OTHER PUBLICATIONS http://www.youtube.com/watch?v=sag0cya3jtc&feature=player_detailpage ; Sep. 17, 2007; "Hook-A-Rack the Ultimate ATV/UTV Loader!", by hookarack (attached stills from video).*

* cited by examiner

LOAD LIFTING SYSTEM

CROSS-REFERENCE TO RELATED APPLICATIONS

This application claims benefit of priority of application Ser. No. 12/123,915 filed on May 20, 2008, which claims benefit to provisional application 60/939,395 filed on May 22, 2007, each of which is hereby incorporated in its entirety.

BACKGROUND OF THE INVENTION

Field of the Invention

The present invention relates to lift systems and devices for ATV's and UTV's and more particularly pertains to a new Load Lifting System for providing a easy lift accessory which may be utilized by one person.

Description of the Prior Art

The use of lift systems and devices for ATV's and UTV's is known in the prior art. More specifically, lift systems and devices for ATV's and UTV's heretofore devised and utilized are known to consist basically of familiar, expected and obvious structural configurations, notwithstanding the myriad of designs encompassed by the crowded prior art which have been developed for the fulfillment of countless objectives and requirements.

Illustrative examples of prior art devices include U.S. Pat. Nos. 5,662,451; 5,911,556; 5,964,565; 5,975,831; 6,609,481; 6,626,748; 6,638,001; and 6,869,26.

In these respects, the Load Lifting System according to the present invention substantially departs from the conventional concepts and designs of the prior art, and in so doing provides an apparatus primarily developed for the purpose of providing a easy lift accessory which may be utilized by one person.

SUMMARY OF THE INVENTION

In view of the foregoing disadvantages inherent in the known types of lift systems and devices for ATV's and UTV's now present in the prior art, the present invention provides a new Load Lifting System construction wherein the same can be utilized for providing a easy lift accessory which may be utilized by one person.

To attain this, the present invention generally comprises A vehicle mounting assembly to selectively secure the load lifting system to the vehicle and which may include a plurality of hook members for engaging a rack mounted to the vehicle and a bumper mounting assembly for abutting a surface of a bumper of the vehicle and a load lifting assembly pivotally coupled to the vehicle mounting assembly and operationally coupleable to a winch mounted on the vehicle, additionally the load lifting assembly may include a plurality of pivotally mounted load carrying hooks for facilitating the transport of liquid and dry goods while minimizing spillage.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

One significant advantage of the present invention is the quick one-person mounting and dismounting of the system onto an ATV or UTV.

Another significant advantage of the present invention is the automated raising and lowering of the basket assembly when operationally coupled to an existing winch mounted on the vehicle.

Still a further advantage of the present invention are the pivotally mounted hook used on the basket assembly to facilitate carrying of buckets of liquid and dry goods.

Further advantages of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects of the invention will become apparent when consideration is given to the following detailed description thereof. Such description makes reference to the annexed drawings wherein.

DESCRIPTION OF PREFERRED EMBODIMENTS

With reference now to the drawings, and in particular to FIGS. 1 through 6 thereof, a new Load Lifting System embodying the principles and concepts of the present invention and generally designated by the reference numeral 10 will be described.

As best illustrated in FIGS. 1 through 6, the Load Lifting System 10 generally comprises a vehicle mounting assembly 20 and a load lifting assembly 60. The vehicle mounting assembly 20 is selectively mounted to the vehicle. The vehicle mounting assembly 20 allows the load lifting system 10 to be quickly mounted to and dismounted from the vehicle after an initial set-up or fitting to match the specific dimensions of the vehicle. The load lifting assembly 60 is operationally coupled of the vehicle mounting assembly 20.

Figure 1:
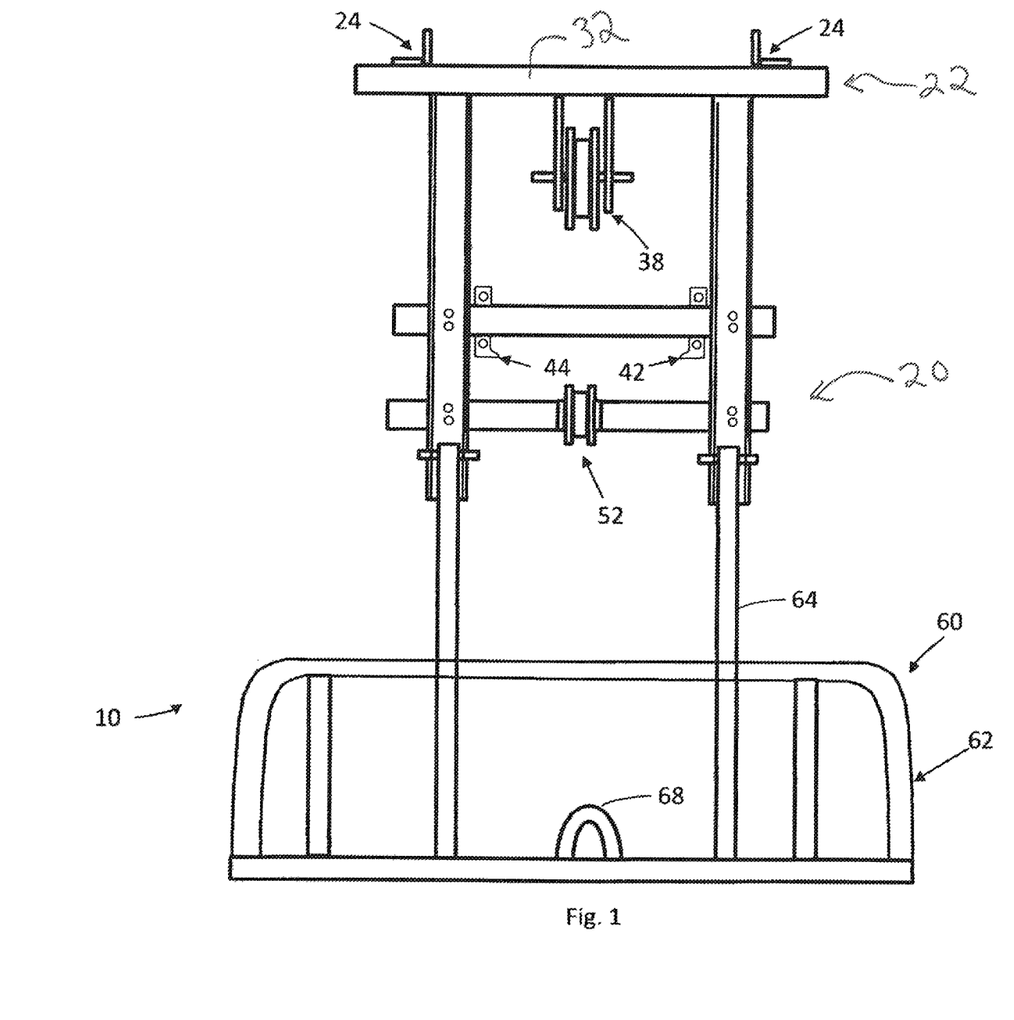
FIG. 1 is a schematic front view of a new Load Lifting System according to the present invention.
Figure 2:
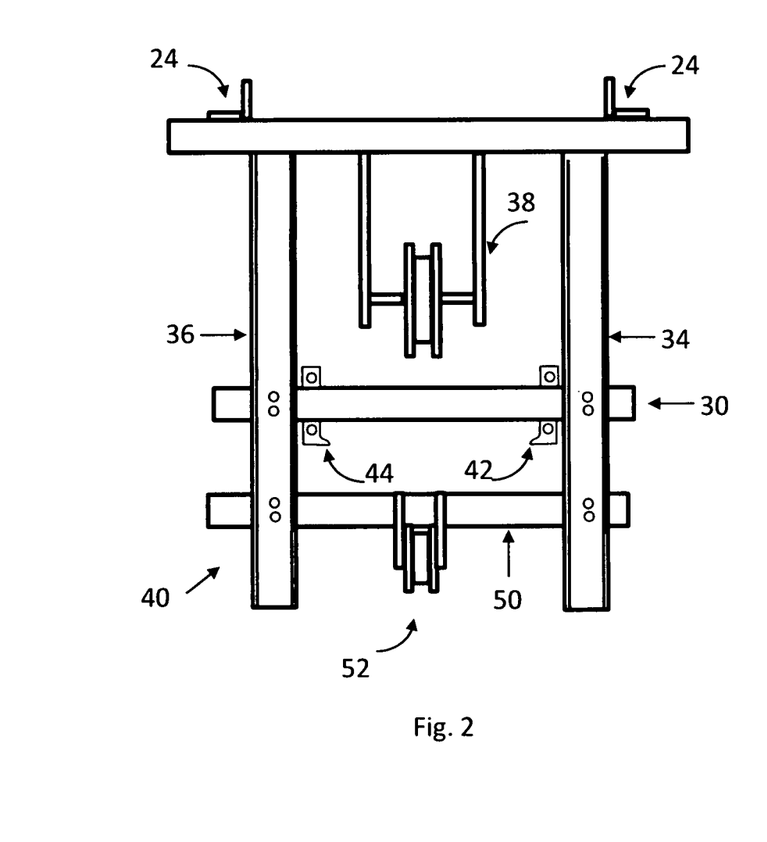
FIG. 2 is a schematic front view of an embodiment of the vehicle mounting assembly of the present invention.
Figure 3:
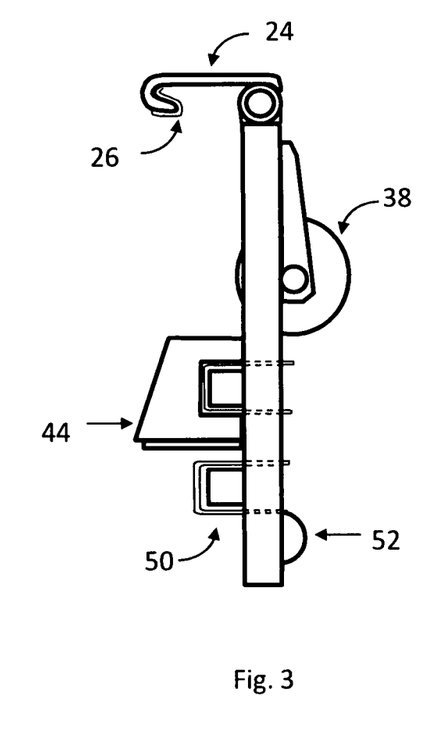
FIG. 3 is a schematic side view of an embodiment of the vehicle mounting assembly of the present invention.

In an embodiment, the vehicle mounting assembly 20 further comprises a rack mounting assembly 22 including at least one hook 24 member. The rack mounting assembly 22 may be engaged to a bar of a rack mounted to the vehicle. Preferably the rack mounting assembly 22 utilizes at least one hook member 24 for engaging a portion of bar of the rack. The hook 24 allows for a quick connection to the rack without requiring the use of straps, threaded fasteners, rivets, welds, or other similar conventional means of mechanical attachment. More preferably, at least two hooks 24 are used in a spaced arrangement to engage a "left" and "right" portion of the rack.

In a further embodiment, a protective edging member 26 positioned along a portion of the hook 24 member and abutting an associated portion of the rack when the hook 24 member engages the rack. This protective edging member 26 reduces wear to the finish of the rack through normal installation, removal, and use of the load lifting system 10.

In still a further embodiment, the thickness of the hook 24 members is at least ¼ inch thick of reduce the likelihood of the hook 24 cutting into the surface finish of the rack prematurely.

In even a further embodiment at least one hook 24 member is may be positioned to accommodate a positioning of the rack relative to a front edge of the vehicle.

In addition to the rack mounting assembly 22, the vehicle mounting assembly 20 generally further includes a bumper mounting assembly 30 which selectively abuts a bumper mounted to the vehicle. For some bumper assemblies, a plastic housing or cover needs to be removed prior to installing the load lifting system 10 on the vehicle.

In an embodiment the bumper mounting assembly 30 further comprises an upper frame horizontal member 32, a right vertical mounting member 34, a left vertical mounting member 36, a bumper mounting member 40 a right bumper mount 42, a left bumper mount 44, and a lower tube member 50. The upper frame horizontal member 32 is positioned substantially horizontally. Preferably, the rack mounting assembly 22 is operationally coupled to the upper frame horizontal member 32. The right vertical mounting member 34 is operationally coupled to the upper frame horizontal member 32 and extends downwardly from the upper frame horizontal member 32. Similarly, the left vertical mounting member 36 is also operationally coupled to the upper frame horizontal member 32 and extends downwardly from the upper frame horizontal member 32. The bumper mounting member 40 operationally may be coupled to the right vertical mounting member 34 and the left vertical mounting member 36. The right bumper mount 42 is preferably operationally coupled to the bumper mounting member 40 for abutting a top surface of the bumper of the vehicle substantially adjacent to the right vertical mounting member 34. Similarly, the left bumper mount 44 is also preferably operationally coupled to the bumper mounting member 40 for abutting a top surface of the bumper of the vehicle substantially adjacent to the left vertical mounting member 36. The lower tube member 50 is preferably operationally coupled to the right vertical mounting member 34 and the left vertical mounting member 36. The lower tube member 50 is positioned in a substantially horizontal orientation.

In another embodiment In an embodiment the bumper mounting assembly 30 further comprises an upper frame horizontal member 32, a right vertical mounting member 34, a left vertical mounting member 36, a bumper mounting member 40 a bumper mount, and a lower tube member 50. The upper frame horizontal member 32 is positioned substantially horizontally. Preferably, the rack mounting assembly 22 is operationally coupled to the upper frame horizontal member 32. The right vertical mounting member 34 is operationally coupled to the upper frame horizontal member 32 and extends downwardly from the upper frame horizontal member 32. Similarly, the left vertical mounting member 36 is also operationally coupled to the upper frame horizontal member 32 and extends downwardly from the upper frame horizontal member 32.

The bumper mounting member 40 operationally may be coupled to the right vertical mounting member 34 and the left vertical mounting member 36. The bumper mount is preferably operationally coupled to the bumper mounting member 40 for abutting a top surface of the bumper of the vehicle and extends substantially between the right vertical mounting member 34 and the left vertical mounting member 36. The lower tube member 50 is preferably operationally coupled to the right vertical mounting member 34 and the left vertical mounting member 36. The lower tube member 50 is positioned in a substantially horizontal orientation.

In a preferred embodiment, the upper frame horizontal member 32 is permanently coupled to the right vertical mounting member 34 and the left vertical mounting member 36 by welding, by being cast as a single unit, or other suitable process.

In a further preferred embodiment, the bumper mounting member 40 and the lower tube member 50 are selectively attached to the right vertical mounting member 34 and the left vertical mounting member 36 through the use of a combination of u-bolts, washers, nuts, and a plurality of apertures through each of the right and left vertical mounting members 36. The u-bolts may be positioned through a selected pairing of apertures. Thus, the relative height of the bumper mounting member 40 and the lower tube member 50 may be adjusted to match the requirements of a specific vehicle.

In still a further preferred embodiment, the right bumper mount 42 and the left bumper mount 44 are each selectively attached to the bumper mounting member 40 through the use of a u-bolt positioned substantially around the associated left or right bumper mounts 42, washers, nuts, and at least a pair of apertures through each one of said right and left bumper mounts 44. Thus, the relative horizontal positioning of the right and left bumper mounts 44 relative to the bumper mounting member 40 is adjustable by the user.

In an embodiment the bumper mounting member 40 is vertically positionable along the right vertical member and the left vertical member. Thus, a height of the bumper mounting member 40 may be adjusted to accommodate a height of the bumper mounted to the vehicle.

Figure 4:
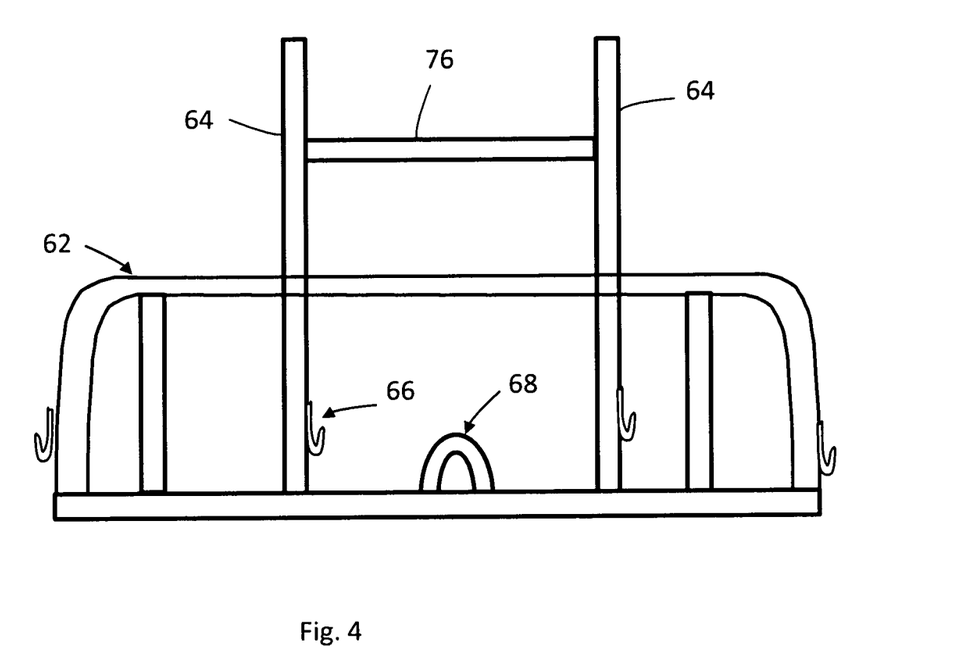
FIG. 4 is a schematic front view of an embodiment of the load listing assembly of the present invention with a supplemental crossbar.
Figure 5:
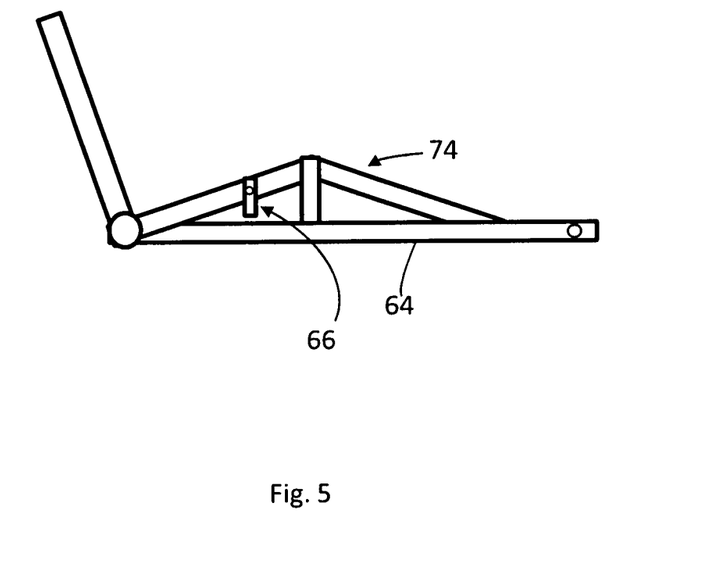
FIG. 5 is a schematic side view of an embodiment of the load lifting assembly of the present invention with a support bracket.

In an embodiment the load lifting assembly 60 further comprises a plurality of arm members 64 and a basket assembly 62. Preferably a pair of arm members 64 is used and each one of the pair of arm members is pivotally coupled to the vehicle mounting assembly 20. More preferably, each one of the pair of arm members 64 is pivotally coupled to a lower portion of an associated one of said left and right vertical mounting members 34,36.

The basket assembly 60 is operationally coupled to the plurality of arm members 64. In at least one embodiment, the basket assembly 60 has a pair of flange members with a plurality apertures extending therethrough, and each one of the arm members 64 has a corresponding flange also which an associated plurality of apertures extending therethrough. The associated flange portions may be coupled together using bolts with washers and nuts, screws, rivets, or other suitable mechanical fastening systems.

In at least one embodiment, the load lifting assembly further comprises a plurality of support brackets 74. Each one of the plurality of support brackets 74 extend between an associated one of the plurality of arm members 64 and basket assembly 62. Preferably, each one of the support brackets is substantially L-shaped.

In another embodiment, the load lifting assembly further comprises a crossbar 76 extending between at least a pair of said plurality of arm members for providing additional rigidity in the load lifting assembly.

In a preferred embodiment, the basket assembly 60 further includes a plurality of pivotable hooks 66 for carrying additional load, such as buckets of liquid or dry goods. The pivoting action of the hooks 66 minimizes the likelihood of spillage during transport.

In a further embodiment, the load lifting system 10 includes at least one strap 72 for selectively securing a load, such as a game animal, wood, hay bales, debris, or other materials to the basket assembly.

Preferably, the load lifting system 10 is used in combination with a winch mounted to the vehicle. The winch provides the power to raise or lower the basket assembly as desired by the user. Additionally the tension from the winch cable helps to secure the system to the vehicle during transport, this tension provides a force urging the hooks 24 against the rack of the vehicle and the bumper mounts 42,44 against the surface of the bumper.

In a preferred embodiment, the basket assembly includes a winch hook 24 receiving portion. Additionally, a lower tube pulley assembly 52 is operationally coupled to the lower tube member 50 and an upper frame pulley assembly 38 operationally coupled to the upper frame horizontal member 32. Thus the winch cable may be directed from the winch, through the lower tube pulley assembly 52, through the upper frame pulley assembly 38 and to the basket assembly where the winch hook may be coupled to the winch hook receiving portion 68.

In at least one embodiment, the lower tube pulley assembly 52 provides enough clearance around the pulley to allow the winch hook to be routed through the lower tube pulley assembly 52 without any disassembly.

In at least one further embodiment the upper tube pulley assembly 38 provides enough clearance around the pulley to allow the winch hook to be routed through the upper tube pulley assembly 38 without any disassembly.

Figure 6:
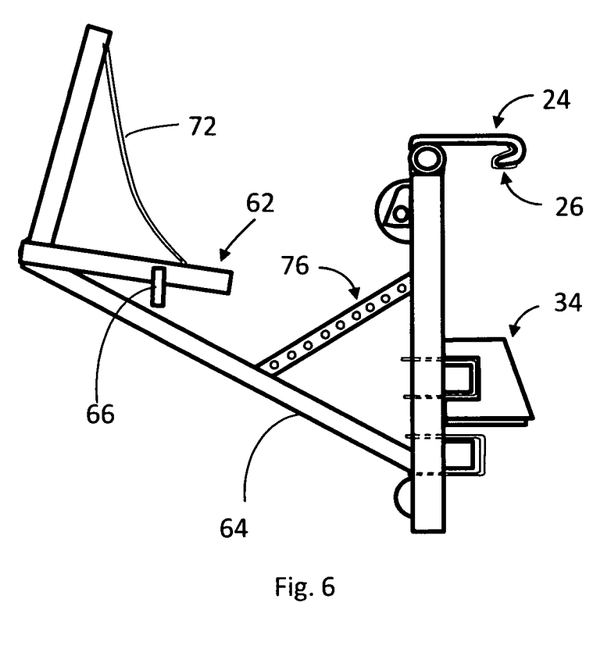
FIG. 6 is a schematic side view of an embodiment of the present invention in a deployed configuration.
Figure 7:
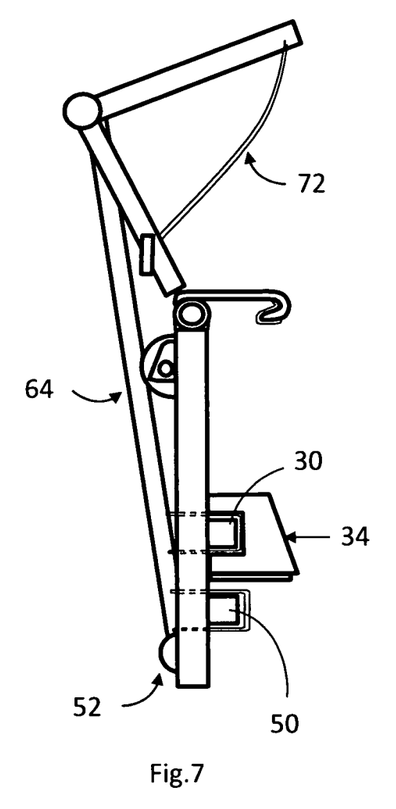
FIG. 7 is a schematic side view of an embodiment of the present invention in a stored configuration.

In still a further embodiment, the load lifting system 10 further includes a locking bar assembly 70. The locking bar assembly 70 has a first end operationally coupled to the vehicle mounting assembly 20. Similarly, the locking bar assembly 70 has a second end operationally coupled to the load lifting assembly 60. The locking bar assembly 70 is used during transport to provide additional securing force holding the basket assembly in place.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A load lifting system for use on a vehicle comprising:
   a vehicle mounting assembly, said vehicle mounting assembly being selectively coupleable to the vehicle, said vehicle mounting assembly further comprising
      a rack mounting assembly, said rack mounting assembly being engageable to a rack mounted to the vehicle, and
      a bumper mounting assembly, said bumper mounting portion selectively abutting a bumper mounted to the vehicle, said bumper mounting assembly further comprising
         an upper frame horizontal member, said upper frame horizontal member being positioned substantially horizontally, said rack mounting assembly being operationally coupled to said upper frame horizontal member,
         a right vertical mounting member operationally coupled to said upper frame horizontal member and extending downwardly from said upper frame horizontal member,
         a left vertical mounting member operationally coupled to said upper frame horizontal member and extending downwardly from said upper frame horizontal member, and
         a bumper mounting member operationally coupleable to said right vertical mounting member and said left vertical mounting member;
   a load lifting assembly, said load lifting assembly being operationally coupleable to said vehicle mounting assembly;
   a right bumper mount operationally coupled to said bumper mounting member for abutting a top surface of the bumper of the vehicle substantially adjacent to said right vertical mounting member; and
   a left bumper mount operationally coupled to said bumper mounting member for abutting a to surface of the bumper of the vehicle substantially adjacent to said left vertical mounting member.

2. The load lifting system of claim 1, wherein said rack mounting assembly further comprises at least one hook member, said hook member being for engaging a portion of the rack.

3. The load lifting system of claim 1, wherein said rack mounting assembly further comprises a plurality of hook members, each one of said plurality of hook members being for engaging an associated portion of the rack.

4. The load lifting system of claim 3, wherein each one of said plurality of hook members is positionable to accommodate a positioning of the rack relative to a front edge of the vehicle.

5. The load lifting system of claim 1, wherein said bumper mounting member is vertically positionable along said right vertical member and said left vertical member whereby a height of the bumper mounting member may be adjusted to accommodate a height of the bumper mounted to the vehicle.

6. The load lifting system of claim 1, further comprising a lower tube member operationally coupled to said right vertical mounting member and said left vertical mounting member, said lower tube member being positioned in a substantially horizontal orientation.

7. The load lifting system of claim 6, further comprising a lower tube pulley assembly operationally coupled to said lower tube member.

8. The load lifting system of claim 1, further comprising an upper frame pulley assembly operationally coupled to said upper frame horizontal member.

9. The load lifting system of claim 1, wherein said load lifting assembly further comprises:
   a plurality of arm members, each one of said arm members being pivotally coupleable to said vehicle mounting assembly; and
   a basket assembly operationally coupled to said plurality of arm members.

10. The load lifting system of claim 9, wherein said basket assembly further comprises at least one load hook member, each one of said at least one load hook member being pivotally coupled to said basket assembly.

11. The load lifting system of claim 9, further comprising at least one support bracket, said at least one support bracket extending between an associated one of said plurality of arm members and said basket assembly.

12. The load lifting system of claim 9, further comprising a winch hook receiving portion operationally coupled to said basket assembly.

13. The load lifting system of claim 1 further comprising a locking bar assembly, said locking bar assembly having a first end operationally coupleable to said vehicle mounting assembly, said locking bar assembly having a second end operationally coupleable to said load lifting assemble.

14. A load lifting system for use on a vehicle comprising:
   a vehicle mounting assembly, said vehicle mounting assembly being selectively coupleable to the vehicle;
   a load lifting assembly, said load lifting assembly being operationally coupleable to said vehicle mounting assembly;
   wherein said vehicle mounting assembly further comprises:
   a rack mounting assembly, said rack mounting assembly being engageable to a rack mounted to the vehicle;
   a pair of hook members, each one of said pair of hook member being for engaging an associated portion of the rack;
   a bumper mounting assembly, said bumper mounting portion selectively abutting a bumper mounted to the vehicle;
   wherein said bumper mounting assembly further comprises:
   an upper frame horizontal member, said upper frame horizontal member being positioned substantially horizontally, said rack mounting assembly being operationally coupled to said upper frame horizontal member;
   a right vertical mounting member operationally coupled to said upper frame horizontal member and extending downwardly from said upper frame horizontal member;
   a left vertical mounting member operationally coupled to said upper frame horizontal member and extending downwardly from said upper frame horizontal member;

a bumper mounting member operationally coupleable to said right vertical mounting member and said left vertical mounting member;
a lower tube member operationally coupled to said right vertical mounting member and said left vertical mounting member, said lower tube member being positioned in a substantially horizontal orientation;
a lower tube pulley assembly operationally coupled to said lower tube member;
an upper frame pulley assembly operationally coupled to said upper frame horizontal member, said pulley assembly providing clearance for a winch hook to be routed through said upper frame pulley assembly without disassembly;
wherein said load lifting assembly further comprises:
a pair of arm members, each one of said pair of arm members being pivotally coupleable to said vehicle mounting assembly; and
a basket assembly operationally coupled to said plurality of arm members;
said basket assembly further comprises at least one load hook member, each one of said at least one load hook member being pivotally coupled to said basket assembly;
a winch hook receiving portion operationally coupled to said basket assembly; and
a locking bar assembly, said locking bar assembly having a first end operationally coupleable to said vehicle mounting assembly, said locking bar assembly having a second end operationally coupleable to said load lifting assemble.

15. A load lifting system for use on a vehicle comprising:
a vehicle mounting assembly, said vehicle mounting assembly being selectively coupleable to the vehicle;
a load lifting assembly, said load lifting assembly being operationally coupleable to said vehicle mounting assembly;
wherein said vehicle mounting assembly further comprises:
a rack mounting assembly, said rack mounting assembly being engageable to a rack mounted to the vehicle;
at least one hook member, said hook member being for engaging a portion of the rack;
a protective edging member positioned along a portion of said hook member and abutting an associated portion of the rack when said hook member engages the rack;
wherein at least one hook member is positionable to accommodate a positioning of the rack relative to a front edge of the vehicle;
a bumper mounting assembly, said bumper mounting portion selectively abutting a bumper mounted to the vehicle;
wherein said bumper mounting assembly further comprises:
an upper frame horizontal member, said upper frame horizontal member being positioned substantially horizontally, said rack mounting assembly being operationally coupled to said upper frame horizontal member;
a right vertical mounting member operationally coupled to said upper frame horizontal member and extending downwardly from said upper frame horizontal member;
a left vertical mounting member operationally coupled to said upper frame horizontal member and extending downwardly from said upper frame horizontal member;
a bumper mounting member operationally coupleable to said right vertical mounting member and said left vertical mounting member;

a right bumper mount operationally coupled to said bumper mounting member for abutting a top surface of the bumper of the vehicle substantially adjacent to said right vertical mounting member;

a left bumper mount operationally coupled to said bumper mounting member for abutting a top surface of the bumper of the vehicle substantially adjacent to said left vertical mounting member;

a lower tube member operationally coupled to said right vertical mounting member and said left vertical mounting member, said lower tube member being positioned in a substantially horizontal orientation;

a lower tube pulley assembly operationally coupled to said lower tube member;

an upper frame pulley assembly operationally coupled to said upper frame horizontal member;

wherein said bumper mounting member is vertically positionable along said right vertical member and said left vertical member whereby a height of the bumper mounting member may be adjusted to accommodate a height of the bumper mounted to the vehicle;

wherein said load lifting assembly further comprises:

a plurality of arm members, each one of said arm members being pivotally coupleable to said vehicle mounting assembly;

a crossbar extending between at least a pair of said arm members;

a basket assembly operationally coupled to said plurality of arm members;

said basket assembly further comprises at least one load hook member, each one of said at least one load hook member being pivotally coupled to said basket assembly;

a plurality of support brackets, each one of said plurality of support brackets being operationally coupled between an associated one of said plurality of arm members as said basket assembly;

at least one strap member operationally coupleable to said basket assembly;

a winch hook receiving portion operationally coupled to said basket assembly; and a locking bar assembly, said locking bar assembly having a first end operationally coupleable to said vehicle mounting assembly, said locking bar assembly having second end operationally coupleable to said load lifting assemble.

* * * * *